United States Patent
Huseth et al.

(10) Patent No.: US 7,852,205 B2
(45) Date of Patent: Dec. 14, 2010

(54) SYSTEM AND METHOD FOR CALIBRATION OF RADIO FREQUENCY LOCATION SENSORS

(75) Inventors: Steve Huseth, Plymouth, MN (US); Andrew G. Berezowski, Wallingford, CT (US); Henrik Holm, Lakeville, MN (US); Soumitri Kolavennu, Blaine, MN (US)

(73) Assignee: Honeywell International Inc., Morristown, NJ (US)

( * ) Notice: Subject to any disclaimer, the term of this patent is extended or adjusted under 35 U.S.C. 154(b) by 405 days.

(21) Appl. No.: 12/100,486

(22) Filed: Apr. 10, 2008

(65) Prior Publication Data

US 2009/0256699 A1  Oct. 15, 2009

(51) Int. Cl.
G08B 26/00 (2006.01)
(52) U.S. Cl. ...................................... 340/518
(58) Field of Classification Search ................. 340/518, 340/514, 539.21, 539.23, 577, 628, 632; 324/601
See application file for complete search history.

(56) References Cited

U.S. PATENT DOCUMENTS

| | | | |
|---|---|---|---|
| 7,420,464 B2* | 9/2008 | Fitzgerald et al. | 340/539.13 |
| 7,450,024 B2* | 11/2008 | Wildman et al. | 340/669 |
| 2006/0055534 A1* | 3/2006 | Fergusson | 340/562 |
| 2007/0132577 A1 | 6/2007 | Kolavennu | |
| 2007/0241878 A1* | 10/2007 | Jobe et al. | 340/506 |
| 2008/0157970 A1* | 7/2008 | Single et al. | 340/572.1 |

FOREIGN PATENT DOCUMENTS

WO  WO 98/10307 A1  3/1998

OTHER PUBLICATIONS

Amer Catovic et al., "Hybrid TOA/RSS and TDOA/RSS Location Estimating Schemes for Short-Range Wireless Networks", Bechtel Telecommunication Technical Journal, Sep. 2004, vol. 2, No. 2, 8 pages.

(Continued)

Primary Examiner—Phung Nguyen
(74) Attorney, Agent, or Firm—Munck Carter, LLP

(57) ABSTRACT

A method includes receiving, in a scanner, at least one radio-frequency (RF) signal from a sensor proximate to the scanner. The method also includes storing location information, corresponding to a location of the scanner, and signal strength information corresponding to the scanner. The method further includes calibrating location records according to the signal strength information and location information. There is also a system for calibrating location records. The system includes a plurality of sensors each configured to transmit an RF signal. The system also includes a scanner configured to receive at least one RF signal from a sensor proximate to the scanner, store location information corresponding to a location of the scanner, and store signal strength information corresponding to the scanner. The system further includes a location manager configured to receive the stored signal strength information and location information from the scanner and to calibrate location records according to the stored signal strength information and location information.

20 Claims, 3 Drawing Sheets

OTHER PUBLICATIONS

Kaveh Pahlavan et al., "Indoor Geolocation Science and Technology", IEEE Communications Magazine, Feb. 2002, pp. 112-118.

K. W. Cheung et al., "Least Squares Algorithms for Time-of-Arrival-Based Mobile Location", IEEE Transactions on Signal Processing, vol. 52, No. 4, Apr. 2004, pp. 1121-1128.

Jose A. Costa et al., "Achieving High-Accuracy Distributed Localization in Sensor Networks", 2005 IEEE, pp. 641-644.

Muzaffer Kanaan et al., "A comparison of wireless geolocation algorithms in the indoor environment", IEEE Communications Society, 2004, pp. 177-182.

"Notification of Transmittal of the International Search Report and the Written Opinion of the International Searching Authority, or the Declaration" issued in PCT Application No. PCT/US2006/046750 dated Jun. 20, 2007.

* cited by examiner

SYSTEM AND METHOD FOR CALIBRATION OF RADIO FREQUENCY LOCATION SENSORS

TECHNICAL FIELD

This disclosure relates generally to wireless systems and more specifically to a system and method for calibration of radio frequency location sensors.

BACKGROUND

In any facility using a wireless asset location system, it is important to occasionally or periodically calibrate the sensor.

SUMMARY

This disclosure provides a system and method for calibration of radio frequency location sensors.

In a first embodiment, a method includes receiving, in a scanner, at least one radio-frequency (RF) signal from a sensor proximate to the scanner. The method also includes storing location information, corresponding to a location of the scanner, and signal strength information corresponding to the scanner. The method further includes calibrating location records according to the signal strength information and location information.

In another embodiment, a scanner includes a receiver and a storage. The scanner is configured to receive at least one radio-frequency (RF) signal from a sensor proximate to the scanner, and store location information corresponding to a location of the scanner. The scanner is also configured to store signal strength information corresponding to the scanner, wherein the signal strength information and location information are configured for calibrating location records.

In a third embodiment, a system for calibrating location records includes a plurality of sensors each configured to transmit a radio-frequency (RF) signal. The system also includes a scanner having a receiver and a storage, the scanner configured to receive at least one RF signal from a sensor proximate to the scanner, store location information corresponding to a location of the scanner, and store signal strength information corresponding to the scanner. The system also includes a location manager configured to receive the stored signal strength information and location information from the scanner, and to calibrating location records according to the stored signal strength information and location information.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
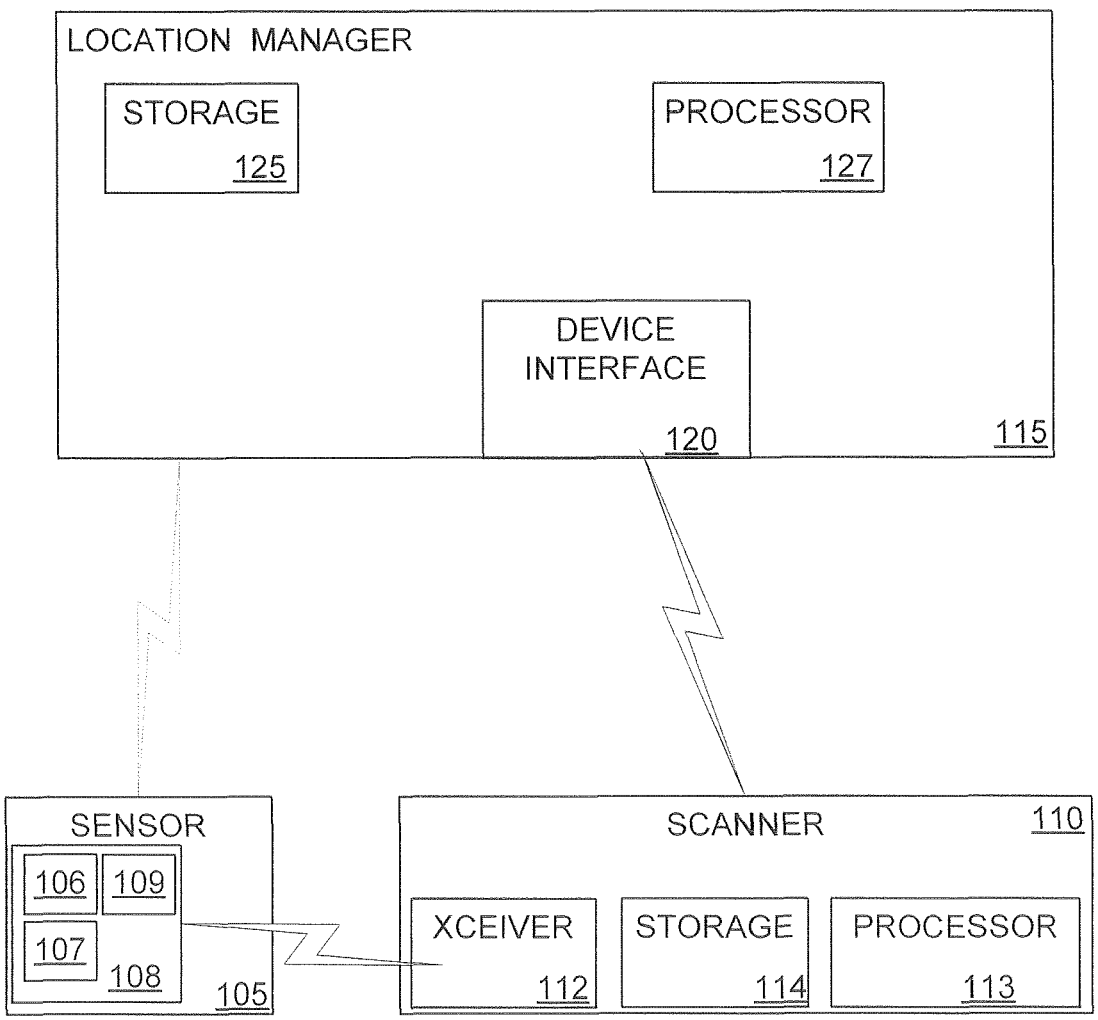
FIG. 1 depicts an exemplary system in accordance with a disclosed embodiment.
Figure 2:
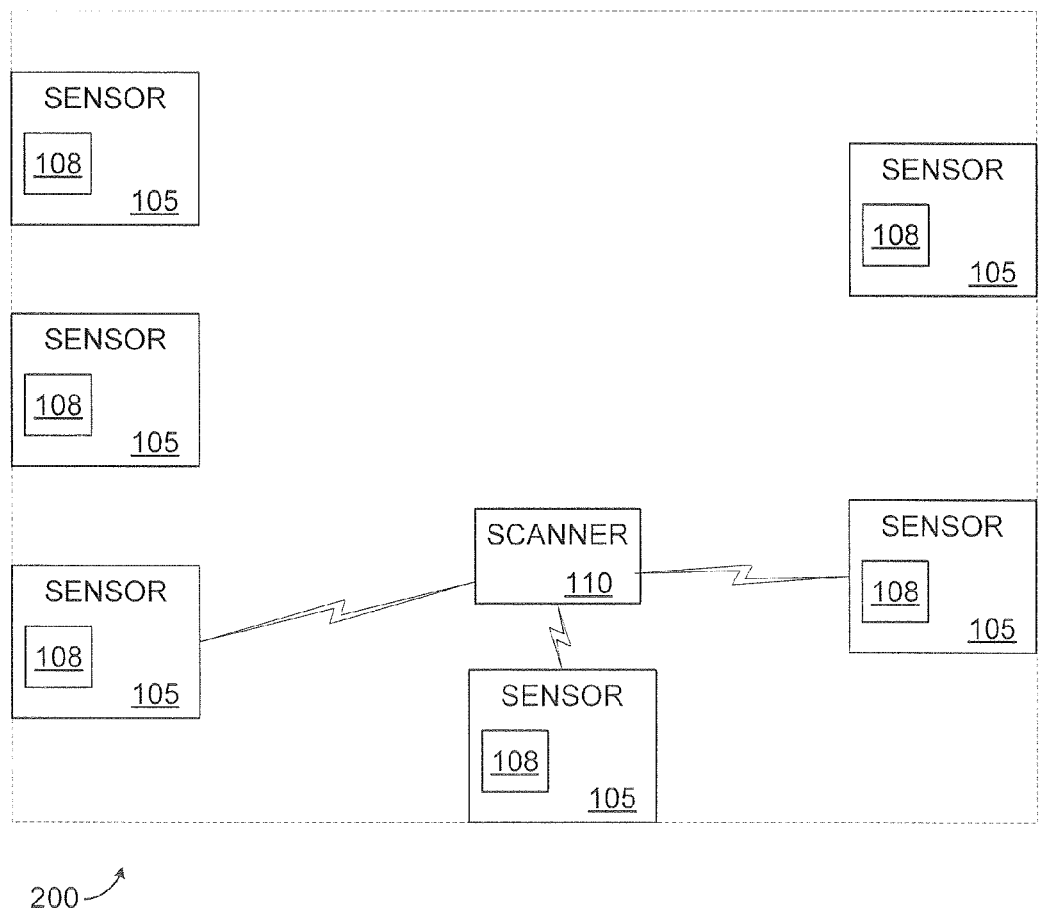
FIG. 2 shows an exemplary implementation of a system as described herein.
Figure 3:
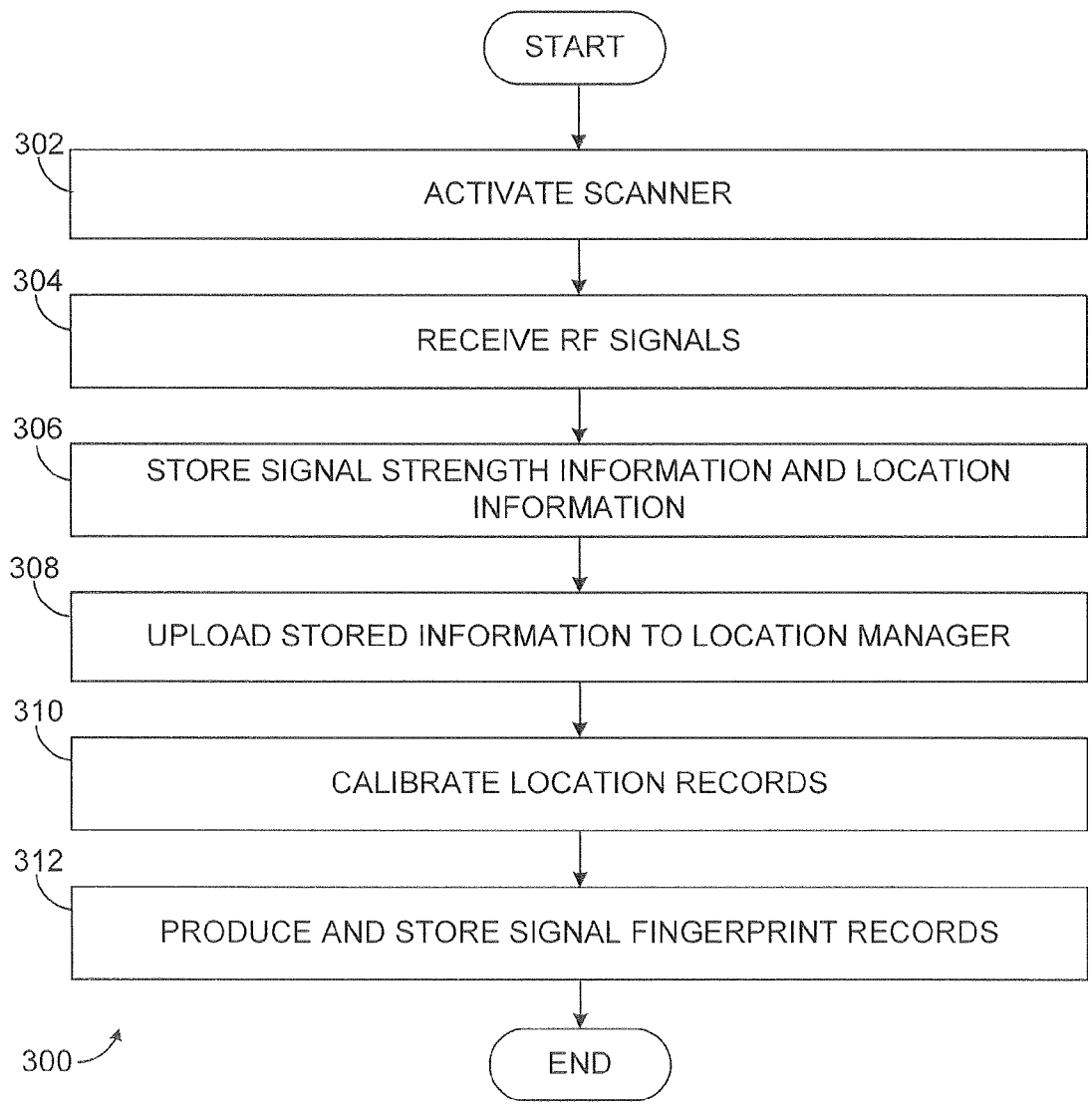
FIG. 3 illustrates an example method for calibration of RF location sensors according to one embodiment of this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

One issue important to the installation and use of a radio-frequency (RF) building asset location system is the placement of sensors at precise known locations through the building. These sensors emit or receive an RF signal from a radio on the mobile person or asset. The strength of the signal, typically referred to as the Received Signal Strength Indicator (RSSI), is combined with other sensors to produce an estimate of the position of the mobile asset.

One aspect that relates to improving the accuracy of this system is accounting for RF signal reflection and attenuation that typically occurs throughout the building, significantly distorting the estimated location. Different construction materials and different building topologies, such as an open atrium versus dense office environments, can introduce significant errors into the estimated mobile asset location.

The disclosed embodiments include a method for easily and cost effectively characterizing the building by measuring the RF signal at many locations throughout the facility. Various embodiments include integrating various pieces of hardware and software together.

One disclosed technique is to embed a RF location sensor into a fire sensor that is part of a fire system. Fire sensors are placed at precise known locations. Furthermore, the fire sensors can be tested periodically by visiting each sensor and verifying its correct operation.

When a technician visits each fire sensor, a calibration signal sent or received by a device carried by the technician can be used to measure and characterize the RF location sensors throughout the building, significantly improving the location accuracy and adapting the system to physical changes to the building topology that have happened since the fire system was last tested.

FIG. 1 depicts an exemplary system 100 in accordance with a disclosed embodiment. Here, location manager 115 includes a device interface 120, a storage 125, and a processor 127. Device interface 120 is configured to communicate with scanner 110 via any conventional connection, including wired and wireless connections, and can be configured to communicate directly with sensors 105. Processor 127 can determine location, calibration, and fingerprint information from signal strength information received from sensors 105 or scanners 110. Storage 125 can store this signal strength information and any determined location, calibration, and fingerprint information, as well as any machine-usable instructions for performing functions as described herein.

Scanner 110 includes a transceiver 112 and a storage 114. Transceiver 112 can be implemented as only a transmitter, only a receiver, or a combination transmitter/receiver according the requirements of the particular implementation, but is shown as a transceiver for the sake of simplicity. Transceiver 112 is configured to communicate with sensor 105, which can be a fire sensor or other device, as described herein. Storage 114 can store any received or determined signal strength information, as well as any machine-usable instructions for performing functions as described herein. Scanner 110 can also include a processor 113 for determining location, calibration, and fingerprint information, and for performing other functions as described herein. The signal strength information and location information are configured for calibrating location records as described herein.

Sensor 105 includes a location apparatus 108, in addition to any other elements (not shown) for implementing the standard functions of the sensor 105. Location apparatus 108 can include a transceiver 106 and a storage 107. Transceiver 106 can be implemented as only a transmitter, only a receiver, or a combination transmitter/receiver according the requirements of the particular implementation, but is shown as a transceiver for the sake of simplicity. Sensor 105 can also include a processor 109, including as part of the location apparatus 108, for determining location, calibration, and fingerprint information, and for performing other functions as described herein.

Note in particular that transceiver 106 is intended to interact with transceiver 112, so if transceiver 106 is implemented only as, for example, an RF transmitter, then transceiver 112 should be implemented with at least a corresponding RF receiver, and vice versa.

Those of skill in the art will recognize that the same technique can be applied to other fixtures of a facility, such as standard or emergency lighting systems, electrical outlets, switches, controls, fixtures, security systems and sensors, and others, in addition to or instead of the fire sensors discussed in detail herein. Any of these are intended to also function as a sensor 105 unless otherwise claimed, although "fire sensor" is used as the specific embodiment as described herein.

Disclosed embodiments include integrating location apparatus 108 into the fire sensors 105 that are part of the fire system. The fire sensors, by code in most jurisdictions, must be placed at precise known locations throughout the facility prior to building occupancy. Furthermore, the fire sensors are often checked regularly, such as by having a technician physically inspect each fire sensor and test its operation through a variety of vendor specified procedures. Note that sensors 105 can also optionally be connected or configured to communicate with location manager 115, particularly in embodiments when the sensor 105 receives a signal from scanner 110.

FIG. 2 shows an exemplary implementation of a system as described herein. Here a building 200, such as a warehouse, is shown that includes a plurality of sensors 105 located throughout. Each sensor 105 includes a location apparatus 108. Scanner 110 is used as described below. As described below, the scanner 110 can send or receive signals from multiple sensors 105 at one time and calibrate the location system based on the relative strengths of the signals.

As part of a fire sensor test procedure, in accordance with disclosed embodiments, a wireless location calibration device, such as scanner 110, is carried by a technician. As a fire sensor test is performed, in the proximity of a physical fire/location sensor 105, the location calibration device will listen for RF signals produced by the transceiver of location apparatus 108 integrated into fire sensors 105 in the vicinity.

Alternatively, the scan 110 will produce an RF signal that is received by the transceiver of location apparatus 108 integrated into fire sensors 105 in the vicinity. The precise location of the technician and the associated scanner 110 can be determined by finding the strongest signal strength, which will correspond to the location apparatus 108 integrated to the fire sensor 105 that is being tested.

The methods described herein enhance various approaches to location sensing, such as multi-lateration and signal fingerprinting. In multi-lateration, RSSI measurements from at least three location sensors 105 are used to determine the location of the scanner 110. According to various disclosed embodiments, when visiting each fire sensor, the actual RSSI values from the three or more location sensors 105 can be compared to the values that would be expected given the location of the scanner 110. The multi-lateration algorithm can be adjusted based on this difference.

Signal fingerprinting requires visiting a large number of locations throughout the facility and measuring the RSSI values from all the location sensors in the vicinity. This collection of signal strengths from specific location sensors is used as a fingerprint. When tracking a person or object, RSSI values from nearby location sensors are collected and used as a query to a database of signal fingerprints. The best match identifies the estimated location. Multiple close matches would indicate the estimated location is in between the locations identified by the fingerprint matches. A number of methods, known to those of skill in the art, may be used to find the closest fingerprint match. A learning system such as a neural net is well suited for this kind of operation.

FIG. 3 illustrates an example method 300 for calibration of RF location sensors according to one embodiment of this disclosure. The embodiment of the method 300 shown in FIG. 3 is for illustration only. Other embodiments of the method 300 may be used without departing from the scope of this disclosure. Various steps in method 300 need not be performed in the order listed unless specifically so stated. Indeed, some steps may be performed concurrently or in reverse order.

In step 302, scanner 110 is activated to perform a calibration. As described above, this can be (but is not necessarily) performed when in the direct proximity of a sensor 105. In particular, when sensor 105 is a fire/smoke sensor, this can be performed during testing of the sensor 105.

In step 304, scanner 110 receives one or more RF signals from a corresponding number of sensors 105. In some cases, it may only receive the RF signal from the sensor to which it is proximate, and in other cases it may receive other signals from other sensors as well.

In step 306, scanner 110 stores signal strength information corresponding to the received RF signals, and can also store information related to the current location of the scanner 110 and/or the location of the sensor to which the scanner 110 is proximate.

Note that in a typical process, steps 302-306 are performed repeatedly to receive and store signal strength information for multiple locations.

In step 308, the scanner 110 communicates with location manager 115 to upload the stored signal strength information and other stored information, including the stored location Information. This communication can be wired or wireless. The received information is stored in storage 125 and is accessible to location manager 115 and processor 127.

In step 310, location manager 115 processes the information stored in storage 125 to calibrate location records according to the stored information.

In step 312, in some embodiments, location manager 115 processes the information stored in storage 125 to produce signal fingerprint records and stores the signal fingerprint records in a database in storage 125.

In some embodiments, the processes performed by the location manager 115 can be performed by the scanner 110 or a sensor 105.

In other embodiments, where the scanner transmits the RF signal received by the sensors 105, a reverse process is performed. When scanner 110 is at a plurality of locations, one or more sensors 105 receive the RF signal it transmits and store corresponding signal strength information. Each sensor 105 can transmit the stored signal strength information to the location manager 115 to be processed as above, to calibrate location records according to the sensors 105 and scanner 110, and to produce similar fingerprint records.

In some embodiments, various functions described above are implemented or supported by a computer program that is formed from computer readable program code and that is embodied in a computer useable medium. The phrase "computer readable program code" includes any type of computer code, including source code, object code, and executable code. The phrase "computer useable medium" includes any type of medium capable of being accessed by a computer, such as read only memory (ROM), random access memory (RAM), a hard disk drive, a compact disc (CD), a digital video disc (DVD), or any other type of memory.

It may be advantageous lo set forth definitions of certain words and phrases used throughout this patent document. The term "couple" and its derivatives refer to any direct or indirect communication between two or more elements, whether or not those elements are in physical contact with one another. The term "application" refers to one or more computer programs, sets of instructions, procedures, functions, objects, classes, instances, or related data adapted for implementation in a suitable computer language. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving, in a scanner, at least one radio-frequency (RF) signal from a sensor proximate to the scanner;
   storing location information corresponding to a location of the scanner and signal strength information corresponding to the scanner; and
   calibrating location records according to the signal strength information and location information.

2. The method of claim 1, further comprising uploading the stored location information and signal strength information to a location manager.

3. The method of claim 1, wherein the receiving includes receiving a plurality of RF signals from a plurality of sensors.

4. The method of claim 1, wherein the receiving is performed when the sensor is being tested.

5. The method of claim 1, wherein the sensor is a fire or smoke sensor.

6. The method of claim 1, further comprising storing signal fingerprint records corresponding to the stored location information and signal strength information.

7. The method of claim 1, wherein the receiving and storing steps are repeated for a plurality of sensors.

8. A scanner comprising a receiver and a storage, the scanner configured to:
   receive at least one radio-frequency (RF) signal from a sensor proximate to the scanner;
   store location information corresponding to a location of the scanner;
   store signal strength information corresponding to the scanner; and
   provide the stored signal strength information and location information for calibrating location records.

9. The scanner of claim 8, wherein the scanner is configured to provide the stored signal strength information and location information by uploading the stored location information and signal strength information to a location manager.

10. The scanner of claim 8, wherein the scanner is configured to receive a plurality of RF signals from a plurality of sensors.

11. The scanner of claim 8, wherein the scanner is configured to communicate with the sensor when the sensor is being tested, and wherein the sensor is a fire or smoke sensor.

12. The scanner of claim 8, wherein the scanner is configured to store signal fingerprint records corresponding to the stored location information and signal strength information.

13. The scanner of claim 8, wherein the sensor is one of a plurality of smoke sensors distributed throughout a warehouse.

14. The scanner of claim 8, wherein the scanner is configured to receive RF signals and store signal strength information for a plurality of sensors at different locations.

15. A system for calibrating location records, comprising:
   a plurality of sensors each configured to transmit a radio-frequency (RF) signal;
   a scanner having a receiver and a storage, the scanner configured to receive at least one RF signal from one of the sensors proximate to the scanner, store location information corresponding to a location of the scanner, and store signal strength information corresponding to the scanner; and
   a location manager configured to receive the stored signal strength information and location information from the scanner and to calibrate location records according to the stored signal strength information and location information.

16. The system of claim 15, wherein the scanner is configured to transmit the stored location information and signal strength information to the location manager.

17. The system of claim 15, wherein the scanner is configured to receive a plurality of RF signals from the plurality of sensors.

18. The system of claim 15, wherein each of the sensors is configured to transmit the RF signal when it is being tested, and wherein each of the sensors is a fire or smoke sensor.

19. The system of claim 15, wherein the location manager is configured to store signal fingerprint records corresponding to the stored location information and signal strength information.

20. The system of claim 15, wherein the scanner is configured to receive RF signals and store signal strength information for the plurality of sensors at different locations.

* * * * *